United States Patent
Gorman et al.

(10) Patent No.: US 6,723,461 B2
(45) Date of Patent: Apr. 20, 2004

(54) WATER MANAGEMENT SYSTEM FOR FUEL CELL

(75) Inventors: Michael E. Gorman, Glastonbury, CT (US); Donald L. Maricle, Glastonbury, CT (US); Carl A. Reiser, Stonington, CT (US); John C. Trocciola, Glastonbury, CT (US); Leslie L. Van Dine, Manchester, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 165 days.

(21) Appl. No.: 10/071,626

(22) Filed: Feb. 8, 2002

(65) Prior Publication Data

US 2002/0086195 A1 Jul. 4, 2002

Related U.S. Application Data

(63) Continuation of application No. 09/267,416, filed on Mar. 12, 1999, now abandoned.

(51) Int. Cl.[7] .......................... H01M 8/12; H01M 2/00; H01M 2/02; H01M 2/14; H01M 4/86
(52) U.S. Cl. .............................. 429/26; 429/34; 429/38; 429/40
(58) Field of Search ...................... 429/34, 40, 38, 429/26

(56) References Cited

U.S. PATENT DOCUMENTS

| | | | | | |
|---|---|---|---|---|---|
| 4,345,008 | A | * | 8/1982 | Breault | 429/26 |
| 4,729,932 | A | * | 3/1988 | McElroy | 429/34 |
| 4,769,297 | A | * | 9/1988 | Reiser et al. | 429/17 |
| 4,824,741 | A | * | 4/1989 | Kunz | 429/26 |
| 5,382,478 | A | * | 1/1995 | Chow et al. | 429/26 |
| 5,503,944 | A | * | 4/1996 | Meyer et al. | 429/13 |
| 5,561,000 | A | * | 10/1996 | Dirven et al. | 429/42 |
| 5,683,828 | A | * | 11/1997 | Spear et al. | 429/13 |
| 5,773,160 | A | * | 6/1998 | Wilkinson et al. | 429/13 |
| 5,853,909 | A | * | 12/1998 | Reiser | 429/13 |
| 6,103,409 | A | * | 8/2000 | DiPierno Bosco et al. | 429/13 |

* cited by examiner

Primary Examiner—Stephen Kalafut
Assistant Examiner—Julian Mercado
(74) Attorney, Agent, or Firm—M. P. Williams

(57) ABSTRACT

An improved water management system for PEM fuel cells is provided. Catalyst layers are disposed on both sides of a proton exchange membrane. Porous plates are positioned adjacent the catalyst layers. Water transport plates are positioned adjacent the porous plates and the reactant gas are humidified at their inlets, in one embodiment by fins, while moisture is removed in the fuel flow path and at the oxidant outlet, in one embodiment by other fins.

8 Claims, 1 Drawing Sheet

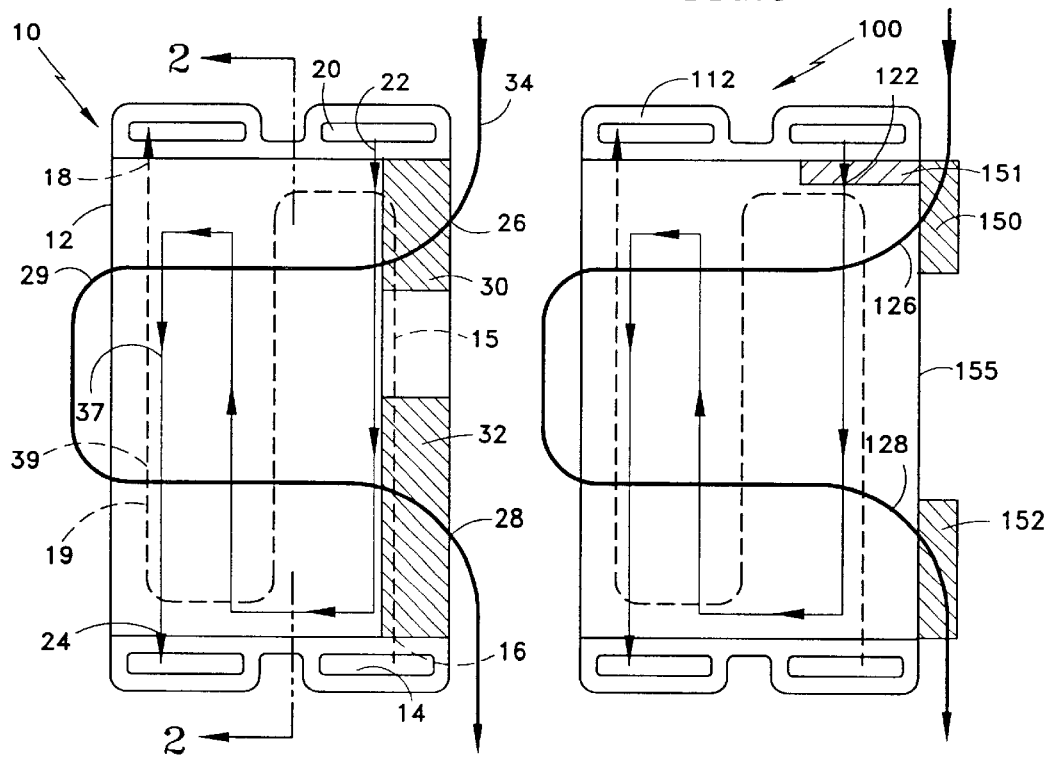

WATER MANAGEMENT SYSTEM FOR FUEL CELL

RELATED APPLICATION

This application is a continuation of application Ser. No. 09/267,416, filed Mar. 12, 1999, now abandoned.

TECHNICAL FIELD

This invention is directed to fuel cells, and more particularly, to a comprehensive water management system for use with a fuel cell.

BACKGROUND ART

Various fuel cell types exist in the prior art. Each fuel cell type, as defined by its electrolyte, has particular design requirements. In a proton exchange membrane (PEM) fuel cell one requirement is to provide an effective water management system. A PEM fuel cell includes a membrane confined between respective porous cathode and anode electrodes. These electrodes comprise a relatively thin catalyst layer on support plate members where the catalyst layer may be deposited either directly on respective major surfaces of the proton exchange membrane or on a porous support plate, wherein the porous support plate, also known as a substrate is in contact with the major surfaces of the proton exchange membrane. These respective cathode and anode catalyst layers reside at the interfaces between the respective electrode plates and the proton exchange membrane. In general, fuel cells function by supplying a gaseous fuel and an oxidant, through supply means, to the anode electrode and cathode electrode, respectively. These supply means distribute the fuel and oxidant gas as uniformly as possible over the surfaces of catalyzed layers of the respective electrodes. When a PEM fuel cell operates, the electrochemical reaction occurring at the catalyzed anode results in electrons and hydrogen ions being formed at the anode. The electrons flow through an external load circuit and the hydrogen ions flow through the membrane to the catalyzed cathode where they react with oxygen to form water and also release thermal energy.

Typically, fuel cell devices include more than one fuel cell, as described above, arranged in electrical series in a stack. Separator plates separate the individual fuel cells from adjacent cells. Usually, these plates have been nonporous, electrically conductive, impermeable separators. However, this invention uses separator plates that have a fine porous construction enabling water transfer therethrough.

In PEM fuel cell devices, water forms at the cathode catalyst layer. As hydrogen ions travel through the proton exchange membrane, the ions drag water at the anode side and carry the same to the cathode side. This activity causes several problematic events. Water accumulates at the cathode catalyst layer, requiring removal to avoid denying the gaseous oxidant access to the reaction surface thereof. Secondly, the anode side dries out due to the water depletion, thereby requiring measures for water replenishment.

It is known that the porosity of the separator plate along with a system created pressure differential unsatisfactorily achieves water removal from the cathode side and water replenishment to the anode side. U.S. Pat. No. 4,729,932 to McElroy, U.S. Pat. No. 5,503,944 to Meyer and U.S. Pat. No. 4,824,741 to Kunz disclose fuel cell designs that inadequately achieve these principles. Additional problems with PEM fuel cell devices can include excessive water loss at the cathode electrode due to dry inlet oxidant gas as well as evaporation of water into the oxidant stream, particularly at the oxidant inlet. That is, these events without corrective measures can lead to membrane dry out and water insufficiency thereby requiring water replenishment. Some prior art fuel cell stack configurations attempt to circumvent the dry out problem by using a condenser external to the stack. The condenser condenses water from the exiting air stream by heat exchange with a cooling medium such as ambient air and returns the water to the cell stack by way of an external loop. Such an approach adds complexity to the fuel cell power plant system and results in increased power plant weight and volume. Similar arrangements humidifying the oxidant gas entering the cathode electrode area to prevent dry out of the cells are known in U.S. Pat. No. 5,382,478 to Chow et al which uses humidifiers external to the cell stack or in the front segment of the stack not used for electrical reaction. Such humidification techniques using external saturators can only saturate the oxidant gas to an average temperature, but cannot account for the temperature variations that occur within the individual fuel cells of the fuel cell stacks.

Various patents disclose devices addressing these water management problems in fuel cells. For example, U.S. Pat. No. 4,345,008 to Breault discloses an apparatus for reducing electrolyte loss from an electrochemical cell using phosphoric acid as an electrolyte to facilitate the electrochemical reaction. The cell includes a condensation zone at the outlet of the oxidant gas. The condensation zone is an electrochemically inactive portion of the cell because it lacks a catalyst. Accordingly, the condensation zone operates at a cooler temperature than the active-catalyst-containing portion of the cell. To further facilitate a temperature reduction, coolant tube density in the area of the condensation zone is increased. Accordingly, the oxidant gas passes through the condensation zone thereby cooling the oxidant gas and condensing the electrolyte out of the gas. The electrode substrate absorbs the condensed electrolyte and returns it to the active portion of the cell. This fuel cell design does not include a similar humidification region for the prevention of cell dry out. Since the fuel cell does not use a PEM membrane, therefore the requirement for hydrating the inlet reactant gas does not exist. It also requires a more complex manufacturing process for forming the coolant tubes used at the condensation zone.

Further, U.S. Pat. No. 4,769,297 to Reiser et al discloses a water management system for a solid polymer electrolyte fuel cell stack. In U.S. Pat. No. 4,769,297 water feeds into the fuel cell stack in the hydrogen reactant stream where some water evaporates to provide cooling while other water migrates through the stack from cell to cell. Water migrates as a result of being dragged from the anode to the cathode through the electrolyte membrane and via the porous separator plates interposed between two adjacent cells in the stack. The reactant pressure differential pressure maintained between the cathode and anode forces the water through the porous separator plates. The anode support plates provide a large enough surface area from which water is evaporated to perform the cell cooling function. This system uses a condenser for removing water from hydrogen exhaust during fuel cell operation, but does not indicate the supply or withdrawal of water to the oxygen reactant gas.

There exists a need for a water management system for use with a PEM fuel cell stack, which system humidifies the oxidant gas and fuel gas at their inlets and condenses water out of the oxidant gas at its outlet, without the use of exterior humidifiers, for preventing membrane dry out and maintaining water self sufficiency of the fuel cell.

DISCLOSURE OF THE INVENTION

The present invention provides a water management system for the cell anode and cathode and integrates this function with the fuel cell coolant system. This integration allows system operation and control that can handle high current density operation at ambient pressure, and start up and shut down conditions because the system efficiently transfers water throughout the cells, and to and from the coolant system, on an as needed basis and at a rate which may be different for each cell.

The anode and cathode components of the invention consists of a tri-element assembly: 1) a water transport plate (WTP), 2) a bilayer plate, and 3) a catalyst layer/membrane surface. At the anode, water and fuel are required at the catalyst/membrane interface in sufficient quantity to replace water being lost through the membrane by proton drag, or from evaporation into the gas stream, and to supply the fuel necessary for the anode reaction. In the present invention, the WTP provides a full planar surface to the bilayer plate and the WTP acts as a water source that may be augmented by inlet stream water saturation up to about 100% relative humidity. The water supplied to the catalyst/membrane surface may be in the form of either a vapor or liquid. The supply rate will always meet the cell requirement because the water management system capacity, which draws on the coolant system, inherently exceeds total cell demand. This system is also partly self-regulating because the temperature of the WTP and the catalyst/membrane surface of each cell are nearly equal.

At the anode, the means for transporting water from the coolant supply through the WTP to the catalyst/membrane surface while also allowing humidified fuel reactant to reach the catalyst is the bilayer component. Typical bilayer components are described in U.S. Pat. No. 5,561,000.

At the cathode, water removal is the primary concern, but cell inlet oxidant humidification is also important. The water at the cathode catalyst/membrane surfaces comes from two sources: proton drag from the anode and product water from the electrochemical cathode reaction. As current density increases, the amount of water at the catalyst/membrane surface increases proportionally. If this water is not removed, cell performance decreases because the reactant gas will be prevented from reaching the catalyst surface due to flooding of the catalyst layer. The problem becomes more severe when air is used as the reactant instead of pure $O_2$. With the present bilayer configuration, water at the catalyst/membrane surface is not able to form a film or droplets because the fine pore layer of the bilayer is hydrophobic with a mean pore size of about $0.1.0\mu$ and 50% porosity. The fine pores force water away from the surface and into the coarse pore layer, which is a less hydrophobic and has a mean pore size of about $20-40\mu$ and 65-75% porosity. The coarse layer may even be hydrophilic. Once in the coarse pore layer, water migrates to the WTP as either a vapor or liquid. At the anode, water moves into the WTP, where the entire WTP planar surface is available for water absorption. This minimizes the water transfer distance across the bilayer, which can be critical at high current densities. It also improves the uniformity of reaction within the cell active area.

The WTP operates as a separator plate, an electrical conductor, a reactant humidifier and distributor, a cell cooler and a water transport device. In combination with the bilayer and membrane assembly, the WTP integrates the cell water management and cooling capabilities into each and every cell in the stack so that individual cell variations for cooling and water transport are provided. The bilayer plate acts as a means for facilitating the movement of reactants, water and electrical current through the fuel cell. The bilayer is configured so that the fine pore layer is directly adjacent to the catalyst layer and the coarse pore layer is directly adjacent to the WTP. On the cathode side, the fine pore ensures that water does not form a liquid film that could impede the flow of reactant gas by flooding the catalyst layer. On the anode side, the fine pore provides a means to feed water from the WTP through the coarse pore to the membrane without inhibiting the flow of fuel to the catalyst by transporting the water through the wetproofed layer primarily in the vapor phase, by an evaporative/recondensation process. The coarse pore layer operates in connection with the fine pore layer as a move open structure that can more both liquid water and water vapor while providing sufficient open pore volume to transport reactant gas to the fine pore. In addition to the above operating processes, the tri-element configuration also provides a means for removing water from the gas distribution channels that may result from operational upsets or malfunctions and start-up or shut down conditions.

It is therefore an object of this invention to provide an improved water management system for a PEM fuel cell stack which will provide sufficient water to the reactant gases to humidify the incoming reactant gases while supplying the necessary water required by the anode while removing water from the cathode catalyst and preventing water from blocking any anode or cathode gas passages.

And still another object of this invention is to provide an improved process for the management of water in a PEM fuel cell.

BRIEF DESCRIPTION OF THE DRAWINGS

FIG. 1 is a schematic end view of the air, coolant, and fuel flow and the associated humidification and condensation zones of a PEM fuel cell in accordance with the principles of the present invention;

FIG. 2 is a more detailed cross-sectional view of adjacent PEM cells in accordance with the water management system of the present invention, taken along line 2—2 of FIG. 1; and FIG. 3 is a schematic view similar to FIG. 1 of an alternative embodiment of the present invention.

MODE(S) FOR CARRYING OUT THE INVENTION

FIG. 1 shows a schematic and sectional representation of a fuel cell arrangement, including the water management system of the present invention, designated generally as 10. System 10 includes a fuel cell 12 having a coolant manifold 14 with a coolant inlet 16 and a coolant outlet 18. Coolant 15 flows in the path 19 depicted by the dotted lines from the coolant inlet 16 to coolant outlet 18. System 10 further includes a fuel manifold 20 with a fuel inlet 22 and a fuel outlet 24. The fuel 37 flowing through cell 12 follows a flowpath similar to that of path 19 for the coolant, but in substantially the opposite direction in the path 39. A manifold (not shown) provides a pathway for an oxidant gas 34, typically air, to enter and exit fuel cell 12. Accordingly, fuel cell 12 includes an air inlet 26 and an air outlet 28 between which the air flows in path 29. Fuel cell 12 further includes a humidification zone 30 and a condensation zone 32. Both the humidification zone 30 and the condensation zone 32 are located in the porous separator plate discussed in more detail below. Humidification zone 30 saturates fuel 37 and air 34 entering fuel cell 12 and a condensation zone 32 condenses water from air 34 before exiting fuel cell 12. In other embodiments, a humidification zone may humidify only one reactant gas, such as the fuel 37 or the oxidant gas 34.

Referring now to FIG. 2, the figure shows a cross-sectional view of adjacent cells 36a and 36b of fuel cell 12. For the purpose of this discussion, individual cell 36a will be discussed in detail, it being understood that the description applies equally to individual cell 36b. Individual cell 36a further includes proton exchange membrane 38a having a cathode catalyst layer 40a and an anode catalyst layer 42a on the major surfaces thereof. Cell 36a further includes a porous bilayer support plate 44a on the anode side thereof and a porous bilayer support plate 46a on the cathode side thereof. Finally, porous water transport plates 48a and 50a define the surfaces of cell 36a, including the elements set forth above therebetween. Similar to as indicated in FIG. 1, air 34 enters inlet 26 on the cathode side of porous water transport plate 50a and exits outlet 28. Also, fuel 37 enters inlet 22 and flows in path 39 exits outlet 24. Coolant 15 preferably in the form of water flows through separator plate 50a, entering plate 50a in the vicinity of or near air outlet 28 and flowing in the vicinity of air inlet 26. Water formed as a by-product of the electrochemical reaction between the hydrogen fuel and the oxidant (air) is moved away from the cathode through the porous bilayer plate 46a toward cathode water transport plate 50 toward the anode water transport plate 48b of the adjacent cell and into the coolant 15.

Accordingly, humidification zone 30 is formed by the presence of coolant in the vicinity of air inlet 26 and fuel inlet 22, thereby allowing the transfer of water into the fuel and air streams from water transport plates 48 and 50. Similarly, since water enters water transport plate 50 in the vicinity of air outlet 28, the plate is coolest in this area thereby allowing for heat exchange with the exiting air in condensation zone 30 and subsequent condensation of the water from this exiting air stream. The water condensed from the exiting air stream is absorbed in the pore structure of water transport plate 50 and reenters the coolant stream.

FIG. 3 is a schematic representation of an alternative embodiment of the present invention, in a fuel cell designated generally as 100. In place of humidification zone 30 and condensation zone 32, fuel cell 100 includes humidification fin 150 and condensation fin 152. As shown in FIG. 3, fins 150 and 152 in the area of the air inlet 126 and the air outlet 128 have an additional humidification zone 151 for the fuel along the fuel inlet zone 122. Fins 150 and 152 extend into the ambient air manifold located between adjacent stacks of a two stack fuel cell arrangement.

Thus, although the present invention has been shown and described with respect to exemplary embodiments thereof, it should be understood by those skilled in the fuel cell art that various changes may be made thereto without departing from the scope of the invention.

We claim:

1. A PEM fuel cell including a water management system, comprising:
    a proton exchange membrane having an anode catalyst layer on a first major face thereof and a cathode catalyst layer on a second major face thereof;
    a first porous plate positioned adjacent said anode catalyst layer and a second porous plate positioned adjacent said cathode catalyst layer;
    first means for directing fuel reactant gas into, through and out of said first porous plate for reaction on said anode catalyst layer of said proton exchange membrane, said first means including a fuel reactant gas inlet and a fuel reactant gas outlet;
    second means for directing oxidant reactant gas into, through and out of said second porous plate for reaction on said cathode catalyst layer of said proton exchange membrane, said second means including an oxidant reactant gas inlet and an oxidant reactant gas outlet;
    a water transport means for directing water into, through and out of said first and second porous plates, said water transport means including a water inlet and a water outlet;
    characterized by the improvement comprising:
    at least one of said reactant gas inlets being disposed for placing corresponding reactant gas entering through said one reactant gas inlet in contact with water within said water transport means for humidifying said corresponding reactant gas; and
    said oxidant reactant gas outlet being adjacent to said water inlet for condensing water from said oxidant reactant gas, thereby removing water from and thereby cooling said oxidant reactant gas.

2. A fuel cell according to claim 1, wherein said first means for directing fuel includes a fuel path from said fuel inlet to said fuel outlet for condensing water from said fuel.

3. A fuel cell according to claim 1 further comprising:
    an oxidant inlet fin extending from said water transport means adjacent said oxidant gas inlet.

4. A fuel cell according to claim 1 further comprising:
    an oxidant outlet fin extending from said water transport means adjacent said oxidant gas outlet.

5. A fuel cell according to claim 1 wherein:
    said second means includes an oxidant reactant gas inlet, an oxidant gas turnaround and an oxidant reactant gas outlet, thereby directing said oxidant reactant gas through said fuel cell just twice.

6. A PEM fuel cell including a water management system, comprising:
    a proton exchange membrane having an anode catalyst layer on a first major face thereof and a cathode catalyst layer on a second major face thereof;
    a first porous plate positioned adjacent said anode catalyst layer and a second porous plate positioned adjacent said cathode catalyst layer;
    first means for directing fuel into, through and out of said first porous plate for reaction on said anode catalyst layer of said proton exchange membrane, said first means for directing including a fuel inlet and a fuel outlet;
    second means for directing an oxidant gas into, through and out of said second porous plate for a reaction on said cathode catalyst layer of said proton exchange membrane, said second means for directing including an oxidant gas inlet and an oxidant gas outlet;
    a water transport means for directing water into, through and out of said first and second porous plates, said water transport means including a water inlet and a water outlet; and
    means for cooling said oxidant gas at said oxidant gas outlet wherein said water inlet of said water transport means is adjacent said oxidant gas outlet and internal to the PEM fuel cell for condensing water from said oxidant gas.

7. A fuel cell according to claim 6, wherein said means for cooling said oxidant gas comprises an oxidant outlet fin extending from said water transport means adjacent said oxidant gas outlet.

8. A fuel cell according to claim 6 wherein:
    said second means includes an oxidant reactant gas inlet, an oxidant gas turnaround and an oxidant reactant gas outlet, thereby directing said oxidant reactant gas through said fuel cell just twice.

* * * * *